US011600852B2

(12) United States Patent
Nakamura

(10) Patent No.: US 11,600,852 B2
(45) Date of Patent: Mar. 7, 2023

(54) MULTILAYER ALL-SOLID-STATE BATTERY

(71) Applicant: Murata Manufacturing Co., Ltd., Nagaokakyo (JP)

(72) Inventor: Takanori Nakamura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 280 days.

(21) Appl. No.: 16/830,501

(22) Filed: Mar. 26, 2020

(65) Prior Publication Data

US 2020/0227780 A1 Jul. 16, 2020

Related U.S. Application Data

(63) Continuation of application No. PCT/JP2018/040646, filed on Nov. 1, 2018.

(30) Foreign Application Priority Data

Nov. 13, 2017 (JP) .............................. JP2017-218077

(51) Int. Cl.
*H01M 10/0562* (2010.01)
*H01M 4/36* (2006.01)
*H01M 10/0585* (2010.01)
*H01M 4/02* (2006.01)
*H01M 50/54* (2021.01)

(52) U.S. Cl.
CPC ......... *H01M 10/0562* (2013.01); *H01M 4/36* (2013.01); *H01M 10/0585* (2013.01); *H01M 50/54* (2021.01); *H01M 2004/021* (2013.01)

(58) Field of Classification Search
CPC .. H01M 10/0562; H01M 50/531; H01M 4/36; H01M 10/0585; H01M 2004/021; H01M 10/282
USPC ........................................................ 429/304
See application file for complete search history.

(56) References Cited

U.S. PATENT DOCUMENTS

| 10,103,376 B2 | 10/2018 | Sugiura |
| 2009/0202912 A1 | 8/2009 | Baba et al. |
| 2014/0338817 A1 | 11/2014 | Baba et al. |

(Continued)

FOREIGN PATENT DOCUMENTS

| JP | 2002352850 A | 12/2002 |
| JP | 2007266034 A | 10/2007 |

(Continued)

OTHER PUBLICATIONS

Mamoru (translation) (Year: 2007).*

(Continued)

*Primary Examiner* — Matthew T Martin
*Assistant Examiner* — Paul Christian St Wyrough
(74) *Attorney, Agent, or Firm* — ArentFox Schiff LLP

(57) ABSTRACT

A multilayer all-solid-state battery having a plurality of first internal electrodes that include a plurality of first-first internal electrodes and a plurality of first-second internal electrodes. The first-first internal electrodes are exposed to a first edge. The first-second internal electrodes are exposed to a first end surface. An end on a second end surface side of an internal electrode of the first-first internal electrodes disposed nearest a first main surface is closer to the first end surface than any of the ends on a second end surface side of the first-second internal electrodes.

20 Claims, 2 Drawing Sheets

(56) References Cited

U.S. PATENT DOCUMENTS

2015/0333376 A1 11/2015 Gaben
2017/0162854 A1 6/2017 Sugiura

FOREIGN PATENT DOCUMENTS

| JP | 2014120372 A | * | 6/2014 | | |
|----|--------------|---|--------|---|---|
| JP | 2015050153 A | | 3/2015 | | |
| JP | 2015069775 A | * | 4/2015 | | |
| JP | 2015069775 A | | 4/2015 | | |
| JP | 2016507865 A | | 3/2016 | | |
| JP | 2017103123 A | | 6/2017 | | |
| WO | 2007135790 A1 | | 11/2007 | | |
| WO | WO-2007135790 A1 | * | 11/2007 | .......... | H01M 10/044 |

OTHER PUBLICATIONS

Takero (translation) (Year: 2015).*
FUJISHIMA (machine translation) (Year: 2014).*
International Search Report Issued for PCT/JP2018/040646, dated Jan. 15, 2019.
Written Opinion of the International Searching Authority issued for PCT/JP2018/040646, dated Jan. 15, 2019.

* cited by examiner

MULTILAYER ALL-SOLID-STATE BATTERY

CROSS REFERENCE TO RELATED APPLICATIONS

The present application is a continuation of International application No. PCT/JP2018/040646, filed Nov. 1, 2018, which claims priority to Japanese Patent Application No. 2017-218077, filed Nov. 13, 2017, the entire contents of each of which are incorporated herein by reference.

FIELD OF THE INVENTION

The present invention relates to multilayer all-solid-state batteries.

BACKGROUND OF THE INVENTION

For conventionally known all-solid-state batteries, no electrolytic solutions are used, and instead solid electrolytes are used. Since no electrolytic solutions are used, such all-solid-state batteries do not cause electrolytic solution leakages and moreover can operate even under a high-temperature atmosphere. For this reason, all-solid-state batteries are attracting strong interest.

Patent Document 1: Japanese Patent Application Laid-Open No. 2007-266034

SUMMARY OF THE INVENTION

From the viewpoint of achieving high-capacity, elements such as positive electrodes, solid electrolyte layers, and negative electrodes can be laminated to form a multilayer all-solid-state battery. As a conceivable example, Patent Document 1 discloses a multilayer ceramic electronic component. Further, as described in Patent Document 1, the multilayer ceramic electronic component can be rounded on its edges and at its corners. This structure successfully suppresses cracks and chips from being formed on the edges and at the corners of the multilayer all-solid-state battery.

As a result of earnest study, however, the present inventor has found that, if its edges are rounded, the capacity of a multilayer all-solid-state battery may become lower than the rated capacity.

A main object of the present invention is to provide a multilayer all-solid-state battery having a structure in which its capacity is less subject to become lower than the rated capacity.

An all-solid-state battery according to the present invention includes a battery main body, a plurality of first internal electrodes, a plurality of second internal electrodes, a first external electrode, and a second external electrode. The battery main body includes a first main surface, a second main surface, a first side surface, a second side surface, a first end surface, a second end surface, a first edge, a second edge, a third edge, and a fourth edge. Each of the first main surface and the second main surface extends in both a length direction and a width direction. Each of the first side surface and the second side surface extends in both the length direction and a thickness direction. Each of the first end surface and the second end surface extends in both the width direction and the thickness direction. The first edge is at an intersection of the first main surface and the first end surface. The first edge has a round shape. The second edge is at an intersection of the first main surface and the second end surface. The second edge has a round shape. The third edge is at an intersection of the second main surface and the first end surface. The third edge has a round shape. The fourth edge is at an intersection of the second main surface and the second end surface. The fourth edge has a round shape. The battery main body contains a solid electrolyte. The plurality of first internal electrodes extend from a first end surface side toward a second end surface side. The plurality of second internal electrodes extend from the second end surface side toward the first end surface side. The plurality of second internal electrodes are disposed to face the first internal electrodes in the thickness direction. The first external electrode covers the first end surface, the first edge, and the third edge. The first external electrode is connected to the plurality of first internal electrodes. The second external electrode covers the second end surface, the second edge, and the fourth edge. The second external electrode is connected to the plurality of second internal electrodes. The plurality of first internal electrodes include a plurality of first-first internal electrodes and a plurality of first-second internal electrodes. The first-first internal electrodes are exposed to the first edge. The first-second internal electrodes are exposed to the first end surface. An end on the second end surface side of an internal electrode of the plurality of first-first internal electrodes disposed nearest the first main surface is closer to the first end surface than any of ends on the second end surface side of the first-second internal electrodes.

DETAILED DESCRIPTION OF THE INVENTION

One example of a preferred embodiment of the present invention will be described below. It should be noted that the embodiments described below are merely examples. The present invention is not limited to such embodiments.

Figure 1:
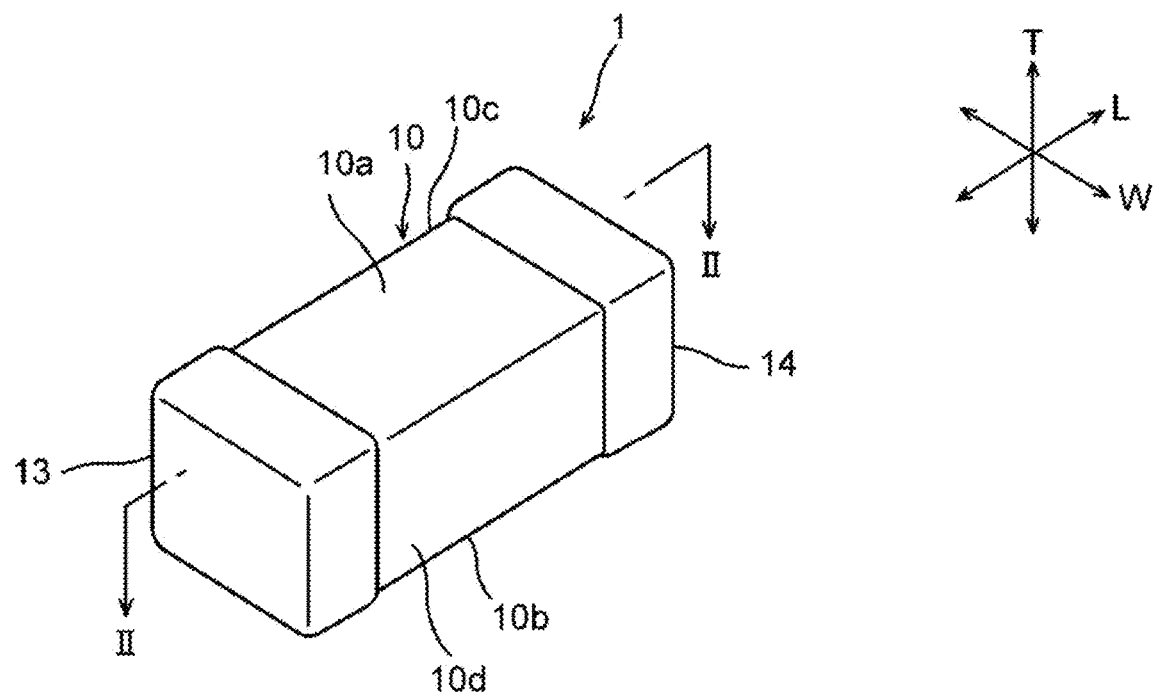
FIG. 1 is a schematic perspective view of a multilayer all-solid-state battery according to an embodiment of the present invention.
Figure 2:
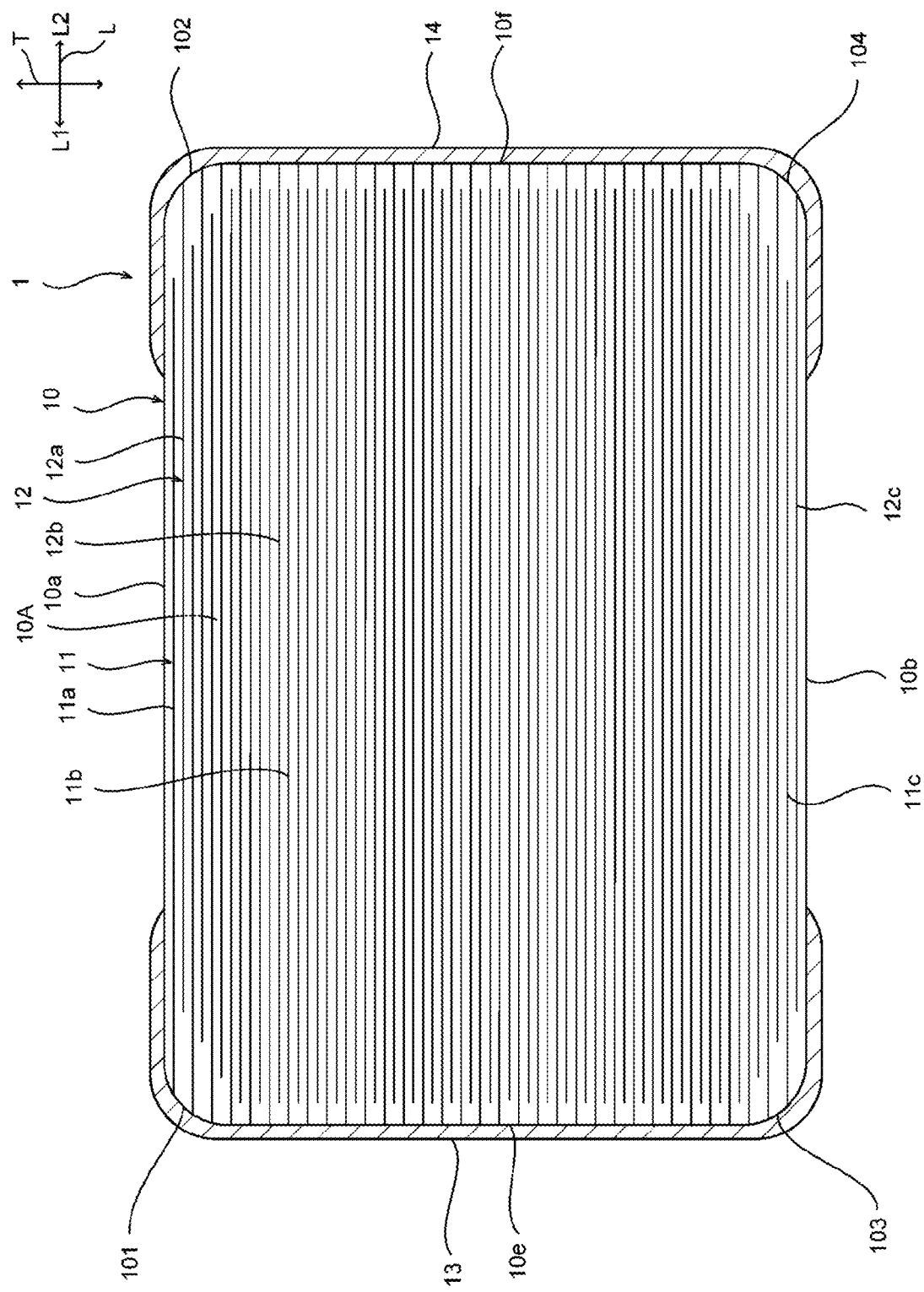
FIG. 2 is a schematic sectional view of the multilayer all-solid-state battery in FIG. 1 taken along the line II-II.

FIG. 1 is a schematic perspective view of a multilayer all-solid-state battery according to one embodiment. FIG. 2 is a schematic cross-sectional view of the multilayer all-solid-state battery taken along the line II-II in FIG. 1. It should be noted that hatching of the battery main body 10 is not described in FIG. 2.

(Battery Main Body 10)

A multilayer all-solid-state battery 1 illustrated in FIGS. 1 and 2 includes a battery main body 10. The battery main body 10 has a substantially rectangular parallelepiped shape. The battery main body 10 has a first main surface 10a, a second main surface 10b, a first side surface 10c, a second side surface 10d, a first end surface 10e, and a second end surface 10f. Each of the first main surface 10a and the second main surface 10b extends in both a length direction L and a width direction W. Each of the first side surface 10c and the second side surface 10d extends in both the length direction L and a thickness direction T. Each of the first end surface 10e and the second end surface 10f extends in both the width direction W and the thickness direction T.

As illustrated in FIG. 2, both the first main surface 10a and the first end surface 10e form a first edge 101 having a round shape (round chamfered shape). Both the first main surface 10a and the second end surface 10f form a second edge 102 having a round shape. Both the second main surface 10b and the first end surface 10e form a third edge 103 having a round shape. Both the second main surface 10b and the second end surface 10f form a fourth edge 104 having a round shape. In short, all of the edges and corners of the battery main body 10 in this embodiment have round shapes (round chamfered shapes).

The battery main body 10 contains a solid electrolyte. The solid electrolyte contained in the battery main body 10 is not limited to a specific one. Examples of a solid electrolyte preferably used include solid electrolytes having a garnet structure and solid electrolytes having a lithium super ionic conductor (LISICON) structure. Examples of solid electrolytes having a garnet type structure include a composition formula $(Li_{[7-ax-(b-4)y]}Ax)\,La_3Zr_{(2-y)}B_yO_{12}$ (A denotes at least one element selected from a group consisting of Ga, Al, Mg, Zn, and Sc; B denotes at least one element selected from a group consisting of Nb, Ta, W, Te, Mo and Bi; $0 \le x \le 0.5$; $0 \le y \le 2.0$; a denotes an average valence of A; and b denotes an average valence of B). Examples of solid electrolytes having a LISICON type structure include a composition formula $(Li_{[3-ax-(5-b)]}Ax)MO4$ (A denotes at least one element selected from a group consisting of Mg, Al, Ga and Zn; M denotes at least one element selected from a group consisting of Zn, Al, Ga, Si, Ge, Ti, P and V; $0 \le x \le 1.0$; a denotes an average valence of A; and b denotes an average valence of M).

(Internal Electrodes 11 and 12 and External Electrodes 13 and 14)

The battery main body 10 has inside thereof a plurality of first internal electrodes 11 and a plurality of second internal electrodes 12. One of each first internal electrode 11 and each second internal electrode 12 serves as a positive electrode, and the other serves as a negative electrode. The first internal electrodes 11 are disposed to face the respective second internal electrodes 12 with solid electrolyte layers 10A interposed therebetween; each of the solid electrolyte layers 10A is formed by the battery main body 10.

The plurality of first internal electrodes 11 extend from a first end surface 10e side (L1 side) toward a second end surface 10f (L2 side). Each of the plurality of first internal electrodes 11 is exposed to the first end surface 10e, the first edge 101, or the third edge 103. None of the plurality of first internal electrodes 11 is exposed to the second end surface 10f, the second edge 102, and the fourth edge 104. The plurality of first internal electrodes 11 include: first-first internal electrodes 11a exposed to the first edge 101; first-second internal electrodes 11b exposed to the first end surface 10e; and first-third internal electrodes 11c exposed to the third edge 103. It should be noted that the plurality of first-first internal electrodes 11a, first-second internal electrodes 11b, and first-third internal electrodes 11c are provided in this embodiment.

The plurality of first internal electrodes 11 are connected to a first external electrode 13. The first external electrode 13 is provided so as to cover the first end surface 10e, the first edge 101, and the third edge 103. More specifically, in this embodiment, the first external electrode 13 is provided so as to cover the first end surface 10e of the battery main body 10 and respective portions of the first main surface 10a, the second main surface 10b, the first side surface 10c, and the second side surface 10d which are all provided on the first end surface 10e side (L1 side).

The plurality of second internal electrodes 12 extend from the second end surface 10f side (L2 side) toward the first end surface 10e side (L1 side). Each of the plurality of second internal electrodes 12 are exposed to the second end surface 10f, the second edge 102, or the fourth edge 104. None of the plurality of second internal electrodes 12 is exposed to the first end surface 10e, the first edge 101, and the third edge 103. The plurality of second internal electrodes 12 include: second-first internal electrodes 12a exposed to the second edge 102; second-second internal electrodes 12b exposed to the second end surface 10f; and second-third internal electrodes 12c exposed to the fourth edge 104. It should be noted that the plurality of second-first internal electrodes 12a, second-second internal electrodes 12b, and second-third internal electrodes 12c are provided in this embodiment.

The plurality of second internal electrodes 12 are connected to a second external electrode 14. The second external electrode 14 is provided so as to cover the second end surface 10f, the second edge 102, and the fourth edge 104. More specifically, in this embodiment, the second external electrode 14 is provided so as to cover the second end surface 10f of the battery main body 10 and respective portions of the first main surface 10a, the second main surface 10b, the first side surface 10c, and the second side surface 10d which are all provided on the second end surface 10f side (or on the L2 side).

(Method of Manufacturing Multilayer All-Solid-State Battery 1)

Next, one example of a method of manufacturing the multilayer all-solid-state battery 1 will be described below.

A solid electrolyte, a binder resin, an organic solvent, and some other materials are mixed together and pulverized to prepare solid electrolyte slurry. Then, the solid electrolyte slurry is applied to a surface of a base film and dried. In this way, a green sheet for a solid electrolyte is fabricated.

A positive electrode active material, a conductive material, a solid electrolyte, an organic solvent, and some other materials are mixed together and pulverized to prepare positive electrode slurry. Then, the positive electrode slurry is applied to a surface of a base film and dried. In this way, a green sheet for a positive electrolyte is fabricated.

A negative electrode active material, a conductive material, a solid electrolyte, an organic solvent, and some other materials are mixed together and pulverized to prepare negative electrode slurry. Then, the negative electrode slurry is applied to a surface of a base film and dried. In this way, a green sheet for a negative electrode is fabricated.

Following the above, internal electrodes having a predetermined shape are printed on a surface of the green sheet for each of the positive and negative electrodes.

Following the above, the green sheets for the solid electrolyte, the positive electrode, and the negative electrode are layered appropriately to fabricate a rectangular parallelepiped stack. Optionally, the rectangular parallelepiped stack may be pressed.

Following the above, the rectangular parallelepiped stack is processed by barrel polishing or any other treatment in such a way that its corners and edges are formed into a round shape.

Following the above, the rectangular parallelepiped stack in which the round corners and the edges have been rounded is subjected to firing, so that the multilayer all-solid-state battery 1 has been completed. It should be noted that barrel polishing and other processing may be performed after the firing, for example.

As a result of earnest study, the present inventor has found that a multilayer all-solid-state battery in which the edges are rounded by barrel polishing and other processing in the above manner may have a lower capacity than its rated capacity. Then, as a result of further earnest study, the present inventor et al. have found the following facts: some first internal electrodes that are exposed to a round edge on a first end surface are also exposed to a round edge on a second end surface; some second internal electrodes that are exposed to the round edge on the second end surface are also exposed to the round edge on the first end surface; and as a result, short circuits occur between first and second external electrodes, thereby lowering the capacity.

In the multilayer all-solid-state battery 1 according to the present embodiment, an end on the second end surface 10f side of the internal electrode of the first-first internal electrodes 11a which is disposed nearest the first main surface 10a is positioned closer to the first end surface 10e than any of the ends on the second end surface 10f side of the first-second internal electrodes 11b. An end on the second end surface 10f side of the internal electrode of the first-third internal electrodes 11c which is disposed nearest the second main surface 10b is positioned closer to the first end surface 10e than any of the ends on the second end surface 10f side of the first-second internal electrodes 11b. An end on the first end surface 10e side of the internal electrode of the second-first internal electrodes 12a which is disposed nearest the first main surface 10a is positioned closer to the second end surface 10f than any of the ends on the first end surface 10e side of the second-second internal electrodes 12b. An end on the first end surface 10e side of the internal electrode of the second-third internal electrodes 12c which is disposed nearest the second main surface 10b is positioned closer to the second end surface 10f than any of the ends on the first end surface 10e side of the second-second internal electrodes 12b. In this case, even if the first edge 101 and the third edge 103 have round shapes, each of the first-first internal electrodes 11a and the second-first internal electrodes 12a are less likely to be exposed to both the first edge 101 and the third edge 103. Even if the second edge 102 and the fourth edge 104 have round shapes, each of the first-third internal electrodes 11c and the second-third internal electrodes 12c are less likely to be exposed to both the second edge 102 and the fourth edge 104. As a result, the first external electrode 13 is less likely to be shorted to the second external electrode 14. Therefore, the multilayer all-solid-state battery 1 in this embodiment has a structure in which its capacity is less subject to become lower than the rated capacity.

From the viewpoint of effectively suppressing the capacity from becoming smaller than the rated capacity, the ends on the second end surface 10f side of all the first-first internal electrodes 11a are preferably positioned closer to the first end surface 10e than any of the ends on the second end surface 10f side of the first-second internal electrodes 11b. The ends on the second end surface 10f side of all the first-third internal electrodes 11c are preferably positioned closer to the first end surface 10e than any of the ends on the second end surface 10f side of the first-second internal electrodes 11b. The end on the first end surface 10e side of all the second-first internal electrodes 12a are preferably positioned closer to the second end surface 10f than any of the ends on the first end surface 10e side of the second-second internal electrodes 12b. The end on the first end surface 10e side of all the second-third internal electrodes 12c is preferably positioned closer to the second end surface 10f than any of the ends on the first end surface 10e side of the second-second internal electrodes 12b.

The length of the first-first internal electrodes 11a is preferably less than that of the first-second internal electrodes 11b. The first-first internal electrodes 11a are preferably provided such that the distance between each first-first internal electrode 11a and the first edge 101 substantially equates with that between each first-second internal electrode 11b and the first end surface 10e. In the present invention, actually, the plurality of first-first internal electrodes 11a may be provided so as to have substantially the same length.

The length of the first-third internal electrodes 11c is preferably less than that of the first-second internal electrodes 11b. The first-third internal electrodes 11c are preferably provided such that the distance between each first-third internal electrode 11c and the third edge 103 substantially equates with that between each first-second internal electrode 11b and the first end surface 10e. In the present invention, actually, the plurality of first-third internal electrodes 11c may be provided so as to have substantially the same length.

The length of the second-first internal electrodes 12a is preferably less than that of the second-second internal electrodes 12b. The second-first internal electrodes 12a are preferably provided such that the distance between each second-first internal electrode 12a and the second edge 102 substantially equates with that between each second-second internal electrode 12b and the second end surface 10f. In the present invention, actually, the plurality of second-first internal electrodes 12a may be provided so as to have substantially the same length.

The length of the second-third internal electrodes 12c is preferably less than that of the second-second internal electrodes 12b. The second-third internal electrodes 12c are preferably provided such that the distance between each second-third internal electrode 12c and the fourth edge 104 substantially equates with that between each second-second internal electrode 12b and the second end surface 10f. In the present invention, actually, the plurality of second-third internal electrodes 12c may be provided so as to have substantially the same length.

From the viewpoint of increasing the capacity of the multilayer all-solid-state battery 1, the first-second internal electrodes 11b are preferably provided such that the end on the second end surface 10f side of each of the first-second internal electrodes 11b overlaps both the second edge 102 and the fourth edge 104, as viewed from the thickness direction T. The second-second internal electrodes 12b are preferably provided such that the end on the first end surface 10e side of each of the second-second internal electrodes 12b overlaps both the first edge 101 and the third edge 103 as viewed from the thickness direction T.

In the foregoing embodiment, as an example, the first internal electrodes 11 and the second internal electrodes 12 are alternately provided in the thickness direction T. The present invention, however, is not limited to this configuration. In the present invention, an aspect of laminating first internal electrodes and second internal electrodes can be determined appropriately in accordance with the rated voltage, the rated electric current, or another factor of the multilayer all-solid-state battery 1.

In the foregoing embodiment, as an example, the plurality of first-first internal electrodes 11a, first-second internal electrodes 11b, first-third internal electrodes 11c, second-first internal electrodes 12a, second-second internal electrodes 12b, and second-third internal electrodes 12c are provided. The present invention, however, is not limited to this configuration. In the present invention, for example, the first-first internal electrodes 11a, the first-second internal electrodes 11b, and at least one second internal electrode 12 may be provided as internal electrodes. A single first-first internal electrode 11a, first-second internal electrode 11b, first-third internal electrode 11c, second-first internal electrode 12a, second-second internal electrode 12b, and second-third internal electrode 12c may be provided.

An all-solid-state battery according to this embodiment includes a battery main body, a plurality of first internal electrodes, a plurality of second internal electrodes, a first external electrode, and a second external electrode. The battery main body includes a first main surface, a second main surface, a first side surface, a second side surface, a first end surface, a second end surface, a first edge, a second edge, a third edge, and a fourth edge. Each of the first main surface and the second main surface extends in both a length direction and a width direction. Each of the first side surface and the second side surface extends in both the length direction and a thickness direction. Each of the first end surface and the second end surface extends in both the width direction and the thickness direction. The first edge is at an intersection of the first main surface and the first end surface. The first edge has a round shape. The second edge is at an intersection of the first main surface and the second end surface. The second edge has a round shape. The third edge is at an intersection of the second main surface and the first end surface. The third edge has a round shape. The fourth edge is at an intersection of the second main surface and the second end surface. The fourth edge has a round shape. The battery main body contains a solid electrolyte. The plurality of first internal electrodes extend from a first end surface side toward a second end surface side. The plurality of second internal electrodes extend from the second end surface side toward the first end surface side. The plurality of second internal electrodes are disposed to face the first internal electrodes in the thickness direction. The first external electrode covers the first end surface, the first edge, and the third edge. The first external electrode is connected to the plurality of first internal electrodes. The second external electrode covers the second end surface, the second edge, and the fourth edge. The second external electrode is connected to the plurality of second internal electrodes. The plurality of first internal electrodes include a plurality of first-first internal electrodes and a plurality of first-second internal electrodes. The first-first internal electrodes are exposed to the first edge. The first-second internal electrodes are exposed to the first end surface. An end on the second end surface side of an internal electrode of the first-first internal electrodes which is disposed nearest the first main surface is positioned closer to the first end surface than any of ends on the second end surface side of the first-second internal electrodes.

According to this embodiment, it is possible to provide a multilayer all-solid-state battery having a structure in which its capacity is less subject to becoming lower than a rated capacity.

In the all-solid-state battery according to this embodiment, the end on the second end surface side of each of the plurality of first-first internal electrodes is preferably positioned closer to the first end surface than any of ends on the second end surface side of the first-second internal electrodes.

In the all-solid-state battery according to this embodiment, the plurality of first internal electrodes may further include a plurality of first-third internal electrodes exposed to the third edge. In this case, an end on the second end surface side of an internal electrode of the first-third internal electrodes which is disposed nearest the second main surface is preferably positioned closer to the first end surface than any of the ends on the second end surface side of the first-second internal electrodes. The end on the second end surface side of each of the plurality of first-third internal electrodes is preferably positioned closer to the first end surface than any of the ends on the second end surface side of the first-second internal electrodes.

In the all-solid-state battery according to this embodiment, the plurality of second internal electrodes may include a plurality of second-first internal electrodes exposed to the second edge and a plurality of second-second internal electrode exposed to the second end surface. In this case, an end on the first end surface side of an internal electrode of the second-first internal electrodes which is disposed nearest the first main surface is preferably positioned closer to the second end surface than any of ends on the first end surface side of the second-second internal electrodes.

In the all-solid-state battery according to this embodiment, the end on the first end surface side of each of the plurality of second-first internal electrodes is preferably positioned closer to the second end surface than any of ends on the first end surface side of the second-second internal electrodes.

In the all-solid-state battery according to this embodiment, the plurality of second internal electrodes may further include a plurality of second-third internal electrodes exposed to the fourth edge. In this case, an end on the first end surface side of an internal electrode of the second-third internal electrodes which is disposed nearest the second main surface is preferably positioned closer to the second end surface than any of the ends on the first end surface side of the second-second internal electrodes. The end on the first end surface side of each of the plurality of second-third internal electrodes is preferably positioned closer to the second end surface than any of the ends on the first end surface side of the second-second internal electrodes.

The invention claimed is:

1. A multilayer all-solid-state battery comprising:
  a battery main body that contains a solid electrolyte, the battery main body including:
    a first main surface;
    a second main surface, each of the first main surface and the second main surface extending in both a length direction and a width direction;
    a first side surface;
    a second side surface, each of the first side surface and the second side surface extending in both the length direction and a thickness direction;
    a first end surface;
    a second end surface, each of the first end surface and the second end surface extending in both the width direction and the thickness direction;
    a first edge having a round shape at an intersection of the first main surface and the first end surface;
    a second edge having a round shape at an intersection of the first main surface and the second end surface;
    a third edge having a round shape at an intersection of the second main surface and the first end surface; and
    a fourth edge having a round shape at an intersection of the second main surface and the second end surface;
  a plurality of first internal electrodes that extend from a first end surface side toward a second end surface side;
  a plurality of second internal electrodes that extend from the second end surface side toward the first end surface side, the second internal electrodes disposed to face the first internal electrodes in the thickness direction;
  a first external electrode that covers the first end surface, the first edge, and the third edge, the first external electrode connected to the plurality of first internal electrodes; and
  a second external electrode that covers the second end surface, the second edge, and the fourth edge, the second external electrode connected to the plurality of second internal electrodes, wherein the plurality of first internal electrodes include a plurality of first-first internal electrodes exposed to the first edge and a plurality of first-second internal electrodes exposed to the first end surface, an end on the second end surface side of an internal electrode of the plurality of first-first internal electrodes disposed nearest the first main surface is closer to the first end surface than any end on the second end surface side of any of the plurality of first-second internal electrodes, and the plurality of first-first internal electrodes and the plurality of first-second internal electrodes are not exposed to the second end surface or the second edge.

2. The multilayer all-solid-state battery according to claim 1, wherein an end on the second end surface side of each of the plurality of first-first internal electrodes is closer to the first end surface than any of the ends on the second end surface side of the plurality of first-second internal electrodes.

3. The multilayer all-solid-state battery according to claim 1, wherein the plurality of first internal electrodes further include a plurality of first-third internal electrodes exposed to the third edge, and an end on the second end surface side of an internal electrode of the plurality of first-third internal electrodes disposed nearest the second main surface is closer to the first end surface than any of the ends on the second end surface side of the plurality of first-second internal electrodes.

4. The multilayer all-solid-state battery according to claim 3, wherein the end on the second end surface side of each of the plurality of first-third internal electrodes is closer to the first end surface than any of the ends on the second end surface side of each of the plurality of first-second internal electrodes.

5. The multilayer all-solid-state battery according to claim 1, wherein the plurality of second internal electrodes include a plurality of second-first internal electrodes exposed to the second edge and a plurality of second-second internal electrodes exposed to the second end surface, and an end on the first end surface side of an internal electrode of the second-first internal electrodes disposed nearest the first main surface is closer to the second end surface than any of end on the first end surface side of any of the plurality of second-second internal electrodes.

6. The multilayer all-solid-state battery according to claim 5, wherein the end on the first end surface side of each of the plurality of second-first internal electrodes is closer to the second end surface than any of the ends on the first end surface side of each of the plurality of second-second internal electrodes.

7. The multilayer all-solid-state battery according to claim 5, wherein the plurality of second internal electrodes further include a plurality of second-third internal electrodes exposed to the fourth edge, and an end on the first end surface side of an internal electrode of the plurality of second-third internal electrodes disposed nearest the second main surface is closer to the second end surface than any of the ends on the first end surface side of the plurality of second-second internal electrodes.

8. The multilayer all-solid-state battery according to claim 7, wherein the end on the first end surface side of each of the plurality of second-third internal electrodes is closer to the second end surface than any of the ends on the first end surface side of each of the second-second internal electrodes.

9. The multilayer all-solid-state battery according to claim 3, wherein the plurality of second internal electrodes include a plurality of second-first internal electrodes exposed to the second edge and a plurality of second-second internal electrodes exposed to the second end surface, and an end on the first end surface side of an internal electrode of the second-first internal electrodes disposed nearest the first main surface is closer to the second end surface than any of end on the first end surface side of any of the plurality of second-second internal electrodes.

10. The multilayer all-solid-state battery according to claim 9, wherein the end on the first end surface side of each of the plurality of second-first internal electrodes is closer to the second end surface than any of the ends on the first end surface side of each of the plurality of second-second internal electrodes.

11. The multilayer all-solid-state battery according to claim 9, wherein the plurality of second internal electrodes further include a plurality of second-third internal electrodes exposed to the fourth edge, and an end on the first end surface side of an internal electrode of the plurality of second-third internal electrodes disposed nearest the second main surface is closer to the second end surface than any of the ends on the first end surface side of the plurality of second-second internal electrodes.

12. The multilayer all-solid-state battery according to claim 11, wherein the end on the first end surface side of each of the plurality of second-third internal electrodes is closer to the second end surface than any of the ends on the first end surface side of each of the second-second internal electrodes.

13. The multilayer all-solid-state battery according to claim 1, wherein an end on the second end surface side of each of the first-second internal electrodes overlaps both the second edge and the fourth edge when viewed in the thickness direction.

14. The multilayer all-solid-state battery according to claim 3, wherein an end on the second end surface side of each of the first-second internal electrodes overlaps both the second edge and the fourth edge when viewed in the thickness direction.

15. The multilayer all-solid-state battery according to claim 5, wherein an end on the second end surface side of each of the first-second internal electrodes overlaps both the second edge and the fourth edge when viewed in the thickness direction.

16. The multilayer all-solid-state battery according to claim 15, wherein an end on the first end surface side of each of the second-second internal electrodes overlaps both the first edge and the third edge when viewed in the thickness direction.

17. The multilayer all-solid-state battery according to claim 5, wherein an end on the first end surface side of each of the second-second internal electrodes overlaps both the first edge and the third edge when viewed in the thickness direction.

18. The multilayer all-solid-state battery according to claim 7, wherein an end on the second end surface side of each of the first-second internal electrodes overlaps both the second edge and the fourth edge when viewed in the thickness direction.

19. The multilayer all-solid-state battery according to claim 18, wherein an end on the first end surface side of each of the second-second internal electrodes overlaps both the first edge and the third edge when viewed in the thickness direction.

20. The multilayer all-solid-state battery according to claim 7, wherein an end on the first end surface side of each of the second-second internal electrodes overlaps both the first edge and the third edge when viewed in the thickness direction.

* * * * *